(12) United States Patent
Watkins

(10) Patent No.: US 10,033,168 B2
(45) Date of Patent: Jul. 24, 2018

(54) MODULAR BLADE CARTRIDGE FOR A CABLE STRIPPING TOOL AND A STRIPPING TOOL UTILIZING A MODULAR BLADE CARTRIDGE

(71) Applicant: PPC Broadband, Inc., East Syracuse, NY (US)

(72) Inventor: Harold J. Watkins, Chittenango, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 14/792,413

(22) Filed: Jul. 6, 2015

(65) Prior Publication Data

US 2016/0006225 A1    Jan. 7, 2016

Related U.S. Application Data

(60) Provisional application No. 62/020,543, filed on Jul. 3, 2014.

(51) Int. Cl.
*H02G 1/12* (2006.01)

(52) U.S. Cl.
CPC ......... *H02G 1/1241* (2013.01); *H02G 1/1224* (2013.01)

(58) Field of Classification Search
CPC ............................ H02G 1/1241; H02G 1/1224
USPC ................ 30/90.1–91.2, 182–185, 241–243; 81/9.4–9.44
See application file for complete search history.

(56) References Cited

U.S. PATENT DOCUMENTS

| | | | | | |
|---|---|---|---|---|---|
| 59,673 | A | * | 11/1866 | Smith | B26B 17/003 30/183 |
| 133,972 | A | * | 12/1872 | Dunlop | A01G 3/025 30/185 |
| 135,887 | A | * | 2/1873 | Chapman | B26B 17/02 30/182 |

(Continued)

FOREIGN PATENT DOCUMENTS

| | | | | |
|---|---|---|---|---|
| CA | 2301951 A1 | * | 9/2001 | ........... H02G 1/1224 |
| EP | 0206376 B1 | * | 6/1990 | ........... H02G 1/1224 |

(Continued)

OTHER PUBLICATIONS

Nov. 24, 2015 International Search Report and Written Opinion issued in International Application No. PCT/US15/39253.

*Primary Examiner* — Jason Daniel Prone
(74) *Attorney, Agent, or Firm* — Oliff PLC

(57) ABSTRACT

A cable stripping tool for preparing a coaxial cable for insertion into a coaxial cable connector includes a receptacle, a cartridge, and a biasing member. The receptacle defines an opening for receiving an end of the coaxial cable, and the opening defines an axis along which an elongate of the coaxial cable extends into the receptacle. The cartridge is disposed in the receptacle and is slidable in a back-and-forth direction substantially orthogonal to the axis of the opening. The cartridge holds at least one cutting blade, which has a blade edge extending substantially orthogonal to the axis of the opening. The biasing member is configured to bias the cartridge toward a first stop surface of the receptacle disposed at an opposite side of the opening relative to the cartridge.

22 Claims, 9 Drawing Sheets

(56) References Cited

U.S. PATENT DOCUMENTS

| | | | | |
|---|---|---|---|---|
| 165,402 A * | 7/1875 | Bates | B26B 17/02 | 30/182 |
| 328,249 A * | 10/1885 | Parker | A01G 3/025 | 30/185 |
| 448,092 A * | 3/1891 | Stout | A01K 17/00 | 30/185 |
| 496,396 A * | 5/1893 | Chaquette | B26B 17/02 | 30/182 |
| 543,234 A * | 7/1895 | Forrester | B21D 53/00 | 30/185 |
| 554,504 A * | 2/1896 | Clinch | A01K 17/00 | 30/243 |
| 569,067 A * | 10/1896 | Silcott | B26B 17/02 | 30/182 |
| 593,940 A * | 11/1897 | Hubbell | B25B 7/02 | 30/185 |
| 631,123 A * | 8/1899 | Norris | A01K 17/00 | 30/243 |
| 674,088 A * | 5/1901 | Hoak | B26B 13/06 | 30/182 |
| 814,100 A * | 3/1906 | Webster | A01K 17/00 | 30/243 |
| 843,353 A * | 2/1907 | McKenna | H02G 1/1224 | 30/90.1 |
| 912,248 A * | 2/1909 | Levin | A01G 3/025 | 30/185 |
| 964,860 A * | 7/1910 | Grandchamp et al. B23D 15/12 | | 30/183 |
| 1,297,389 A * | 3/1919 | Mueller | A61B 17/26 | 30/183 |
| 1,326,819 A * | 12/1919 | Youdelman | B21J 9/025 | 30/185 |
| 1,347,651 A * | 7/1920 | Nauth | A61B 17/26 | 30/182 |
| 1,385,481 A * | 7/1921 | Williams | A61C 7/02 | 30/182 |
| 1,419,789 A * | 6/1922 | Webb | B23D 15/14 | 30/91.2 |
| 1,496,680 A * | 6/1924 | Seamon et al. | A01K 17/00 | 30/185 |
| 1,545,188 A * | 7/1925 | Hultgren | B23D 29/023 | 30/243 |
| 1,668,942 A * | 5/1928 | Cady | B62D 55/32 | 30/182 |
| 1,694,561 A * | 12/1928 | Pickett | B26B 17/02 | 30/184 |
| 1,778,791 A * | 10/1930 | Brant et al. | B26B 17/003 | 30/183 |
| 2,103,597 A * | 12/1937 | Ravenscroft | B23D 29/023 | 30/90.2 |
| 2,421,049 A * | 5/1947 | Bell | H02G 1/1202 | 30/91.1 |
| 2,541,063 A * | 2/1951 | Hubbard | A01G 3/0255 | 30/184 |
| 2,591,409 A * | 4/1952 | Dahl | B25B 27/00 | 30/183 |
| 2,614,322 A * | 10/1952 | Pendleton | B26B 17/02 | 30/183 |
| 2,615,181 A * | 10/1952 | McGaughey | B26B 17/02 | 30/182 |
| 2,660,786 A * | 12/1953 | Loyd | H02G 1/005 | 30/182 |
| 2,820,292 A * | 1/1958 | Bouten et al. | B23D 29/023 | 30/182 |
| 2,995,052 A * | 8/1961 | Funcik | H02G 1/1214 | 30/90.1 |
| 3,070,815 A * | 1/1963 | Marr | A01K 95/02 | 30/183 |
| 3,114,277 A * | 12/1963 | Clendenin | H02G 1/1214 | 30/90.8 |
| D201,521 S * | 6/1965 | Filia | | 30/182 |
| 3,257,722 A * | 6/1966 | Caine | H02G 1/1224 | 30/90.1 |
| 3,403,441 A * | 10/1968 | Eubanks | H02G 1/127 | 30/90.1 |
| 3,596,541 A | 8/1971 | Bieganski | | |
| 3,660,898 A * | 5/1972 | Hast | B23D 29/023 | 30/185 |
| 3,696,509 A * | 10/1972 | Lancaster | H02G 1/1229 | 30/90.6 |
| 3,820,420 A * | 6/1974 | Matthews | H02G 1/1226 | 30/91.2 |
| 3,855,699 A * | 12/1974 | Charlett | A01G 3/02 | 30/242 |
| 3,992,777 A * | 11/1976 | Perkins | B23D 29/007 | 30/182 |
| 4,130,031 A | 12/1978 | Wiener et al. | | |
| 4,217,691 A * | 8/1980 | Todaro | H02G 1/1214 | 30/90.1 |
| 4,285,126 A * | 8/1981 | Irwin | B23D 15/14 | 30/182 |
| 4,463,494 A * | 8/1984 | Bianco, Jr. | A44C 17/043 | 30/90.4 |
| 4,561,282 A * | 12/1985 | Hadden, Sr. | B25B 7/123 | 30/184 |
| 4,625,386 A * | 12/1986 | Bieganski | H01R 43/0421 | 30/90.1 |
| 4,989,325 A * | 2/1991 | Durkin | B26B 17/003 | 30/185 |
| 5,065,513 A * | 11/1991 | Reiswig | A45D 29/02 | 30/241 |
| 5,150,522 A * | 9/1992 | Gwo-Jiang | H02G 1/1224 | 30/91.2 |
| 5,182,859 A * | 2/1993 | Yoshimori | H02G 1/1229 | 30/90.6 |
| 5,337,479 A | 8/1994 | Ducret | | |
| 5,398,413 A * | 3/1995 | Chen | H02G 1/1224 | 30/90.1 |
| 5,469,762 A * | 11/1995 | Krampe | H02G 1/1212 | 30/90.1 |
| 5,533,262 A * | 7/1996 | Clark | A61D 1/005 | 30/242 |
| 6,253,641 B1 * | 7/2001 | Tarpill | H02G 1/1224 | 30/90.6 |
| 6,477,776 B1 * | 11/2002 | Jee | H02G 1/1224 | 30/90.1 |
| 6,557,259 B1 * | 5/2003 | Nguyen | A45D 29/02 | 30/243 |
| 6,581,291 B1 * | 6/2003 | Tarpill | G02B 6/25 | 30/90.1 |
| 6,718,638 B2 * | 4/2004 | Liaw | H02G 1/1224 | 30/90.1 |
| 7,003,883 B2 * | 2/2006 | Tapper | H02G 1/1224 | 30/90.1 |
| 7,971,359 B2 * | 7/2011 | Bzorgi | B23D 29/00 | 30/180 |
| 8,904,647 B2 * | 12/2014 | Steiner | H02G 1/1224 | 30/90.2 |
| 9,425,593 B2 * | 8/2016 | Lin | H02G 1/1224 | 30/90.1 |
| 2003/0188432 A1 * | 10/2003 | Temple | H02G 1/1229 | 30/90.6 |
| 2009/0100681 A1 | 4/2009 | Tarpill | | |
| 2011/0192033 A1 | 8/2011 | Kasprzycki | | |
| 2013/0133203 A1 * | 5/2013 | Stocklein | H02G 1/1217 | 30/90.4 |
| 2014/0173906 A1 * | 6/2014 | Ma | H02G 1/1209 | 30/90.1 |
| 2015/0229089 A1 * | 8/2015 | Watkins | H01R 9/0524 | 29/753 |
| 2016/0036207 A1 * | 2/2016 | Burris | H02G 1/1236 | 30/91.2 |

FOREIGN PATENT DOCUMENTS

| | | | | |
|---|---|---|---|---|
| EP | | 0376505 B1 * | 4/1993 | H02G 1/1224 |
| GB | | 2209886 B * | 5/1991 | H02G 1/1224 |

(56) References Cited

FOREIGN PATENT DOCUMENTS

| JP | 10309018 A | * | 11/1998 | ........... H02G 1/1224 |
| --- | --- | --- | --- | --- |
| WO | WO 8002345 A1 | * | 10/1980 | ........... H02G 1/1224 |
| WO | WO 2016004438 A1 | * | 1/2016 | ........... H02G 1/1241 |

* cited by examiner

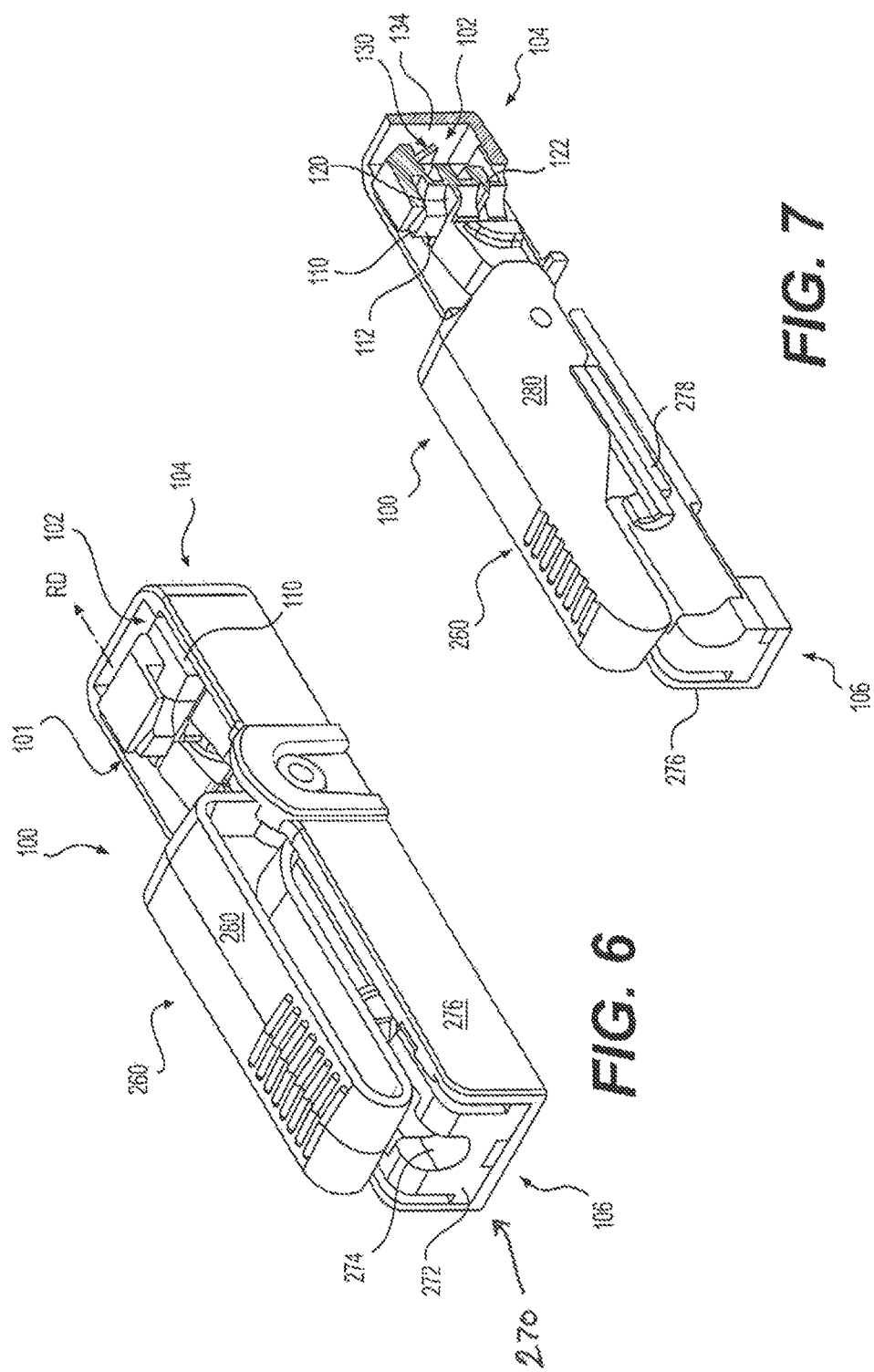

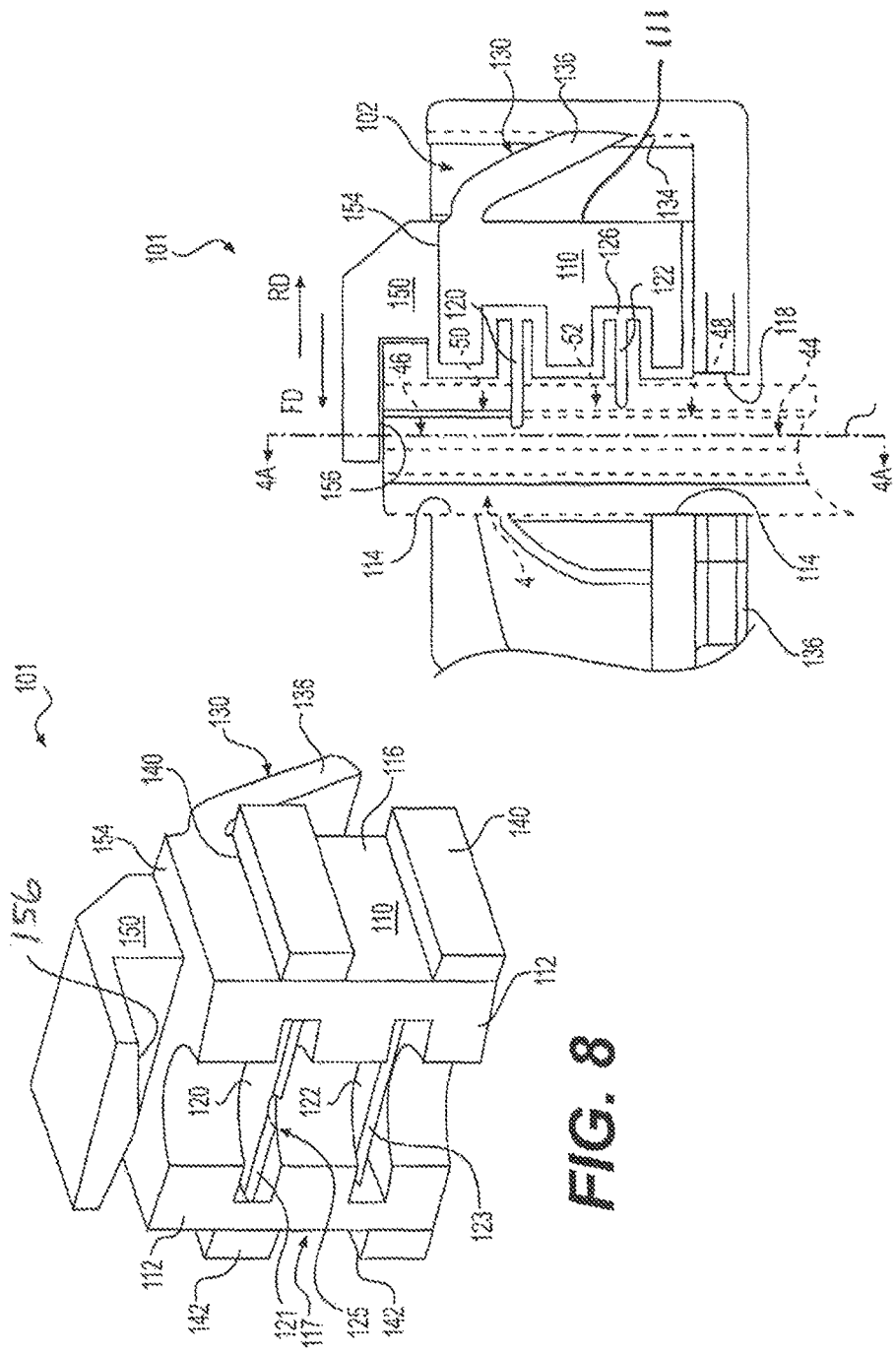

MODULAR BLADE CARTRIDGE FOR A CABLE STRIPPING TOOL AND A STRIPPING TOOL UTILIZING A MODULAR BLADE CARTRIDGE

CROSS-REFERENCE TO RELATED APPLICATIONS

This application is a non-provisional application that claims the benefits of priority of U.S. provisional application No. 62/020,543, filed on Jul. 3, 2014, the disclosure of which is incorporated herein by reference in its entirety.

BACKGROUND

The installation of coaxial cable connectors onto an end of a prepared coaxial cable typically involves the use of specialized tools. Typically, a stripping tool is required to remove cable sheathing to expose a signal-carrying inner conductor and a grounding outer conductor of the cable. The stripping tool removes cable sheathing stepwise along the length of the cable to expose a predetermined length of the signal-carrying inner conductor and, a predetermined length of the grounding outer conductor. More specifically, as illustrate in FIG. 5, at a first length measured from the end of the cable, a first step or cut in the cable removes: (i) innermost dielectric core, (ii) a foil layer, (iii) the grounding conductor, and (iv) a first length of the outermost compliant jacket. At a second length measured from the first step, a second step or cut is produced to remove a second length of the outermost compliant jacket. Accordingly, the first step exposes the signal-carrying inner conductor of the cable and the second step exposes the grounding outer conductor of the cable. The first and second steps are cut by a pair of spaced-apart blades rigidly affixed to a handle or lever arm of the stripping tool.

A conventional stripping tool typically employs a pair of stacked, razor-sharp, cutting devices or blades. The blades are molded in combination with a plastic lever arm that is spring-biased to cut a prescribed distance into the end of the coaxial cable. More specifically, the lever arm is squeezed tight against a stop surface and rotated about the axis of the cable, for example, about three times. Inasmuch as the lever arm imposes a prescribed force, determined by the stiffness/spring-constant of the spring, the cutting blades slice deeper into the cable sheathing (i.e., the outer jacket, the outer conductor, the foil layer and/or the dielectric core) with each turn/revolution. The lever arm is then used to pull the stripped/cut material from the end of the coaxial cable. Inasmuch as the sheathing material is high strength and can be rather course, the cutting blades will dull after about one hundred cycles. Since the blades are molded in combination with the lever arm and the cost of the tool is sufficiently low, the stripping tool is discarded and replaced when the blades become dull.

Accordingly, it may be desirable to provide a cable stripping tool that includes a blade cartridge that is removable when it becomes dull. The removable blade cartridge is discarded and replaced by a new blade cartridge so that a preparer can continue using the cable stripping tool. The cost of the removable blade cartridge is only a fraction of the cost of the cable stripping tool, and thus a cable stripping tool using the removable blade cartridge will lead to cost savings over the life of the cable stripping tool.

Additionally, a compression tool is often required to secure a connector to the prepared end of a coaxial cable. The compression tool causes elements of the connector to frictionally engage and mechanically interlock with the outer conductor and jacket of the coaxial cable. One type of compression tool causes a conductive internal post of the connector to capture the outer conductor/jacket between tightly controlled radial dimensions of the post and a rigid annular body of the connector. In another type of compression tool, the end of the connector body includes a deformable bellows which when compressed in an axial direction deforms radially into the compliant outer jacket of the coaxial cable. Notwithstanding, the type of compression tool employed, the conductive post either produces or reacts the radial forces necessary to compress and capture the outer conductor/jacket between the post and the connector body.

Consequently, two different tools are required to prepare and secure coaxial cable to a cable connector. The cost of preparing and securing a coaxial cable to a cable connector, therefore, includes the cost of both a stripping tool and a compression tool. Further, relying on two different tools can add complexity to the installation process, cause installation inefficiencies, create burdens for carrying inventory of multiple tools and increase the costs associated with servicing customers, which can cause price increases.

Furthermore, it will be appreciated that the cost is also a function of the frequency of tool replacement, exacerbated by a stripping tool that is replaced after as few as one hundred operational cycles. In cost sensitive markets, the cost of these tools can be sufficiently additive so as to prohibit customers from purchasing connectors requiring such tools. As a result, lower quality connectors are typically employed in such cost-sensitive markets.

Accordingly, there is a need to overcome, or otherwise lessen the effects of, the disadvantages and shortcomings described above.

SUMMARY

According to various aspects of the disclosure, a cable stripping tool for preparing a coaxial cable for insertion into a coaxial cable connector includes a receptacle, a cartridge, and a biasing member. The receptacle defines an opening for receiving an end of the coaxial cable, and the opening defines an axis along which an elongate of the coaxial cable extends into the receptacle. The cartridge is disposed in the receptacle and is slidable in a back-and-forth direction substantially orthogonal to the axis of the opening. The cartridge holds at least one cutting blade, which has a blade edge extending substantially orthogonal to the axis of the opening. The biasing member is configured to bias the cartridge toward a first stop surface of the receptacle disposed at an opposite side of the opening relative to the cartridge.

In accordance with some aspects of the disclosure, a method of using a cable stripping tool to prepare a coaxial cable for insertion into a coaxial cable connector, wherein the stripping tool includes a receptacle for receiving a removable cartridge holding at least one cutting blade, includes sliding the cartridge relative to the receptacle to enlarge an opening to receive an end of the coaxial cable. The method further includes inserting the end of the coaxial cable into the opening and permitting a biasing member to urge the cartridge toward the end of the coaxial cable and a first stop surface of the receptacle disposed on an opposite side of the opening relative to the cartridge such that a blade edge of the at least one blade engages the end of the coaxial cable in a direction orthogonal to an elongate axis of the end of the coaxial cable. The tool is then rotated relative to end of the coaxial cable until a stop surface of the cartridge abuts the first stop surface of the receptacle.

According to some aspects of the disclosure, a cartridge for use with a cable stripping tool for preparing a coaxial cable for insertion into a coaxial cable connector includes a mounting body, a first blade, a second blade, and a stop member. The first blade is fixedly mounted to the mounting body and has a first blade edge adjacent a first surface of the cartridge. The second blade is fixedly mounted to the mounting body and has a second blade edge adjacent the first surface of the cartridge. The first blade edge and the second blade edge are spaced apart by a first predetermined distance along an axis orthogonal to the first blade edge and the second blade edge. The first blade and the second blade are configured to provide different cutting depths in a direction orthogonal to the first blade edge and the second blade edge. The stop member is fixedly mounted to the mounting body and has a stop surface spaced a second predetermined distance from the first blade edge and the second blade edge.

BRIEF DESCRIPTION OF THE DRAWINGS

FIG. 6 is a perspective view of an exemplary stripping tool in accordance with various aspects of the disclosure.

FIG. 7 is a perspective cross-sectional view of the exemplary stripping tool of FIG. 6.

FIG. 8 is a perspective view of an exemplary blade cartridge used with the exemplary stripping tool of FIG. 6.

FIG. 9 is a side cross-sectional view of the exemplary blade cartridge of FIG. 8.

DETAILED DESCRIPTION OF THE EMBODIMENTS

Figure 1:
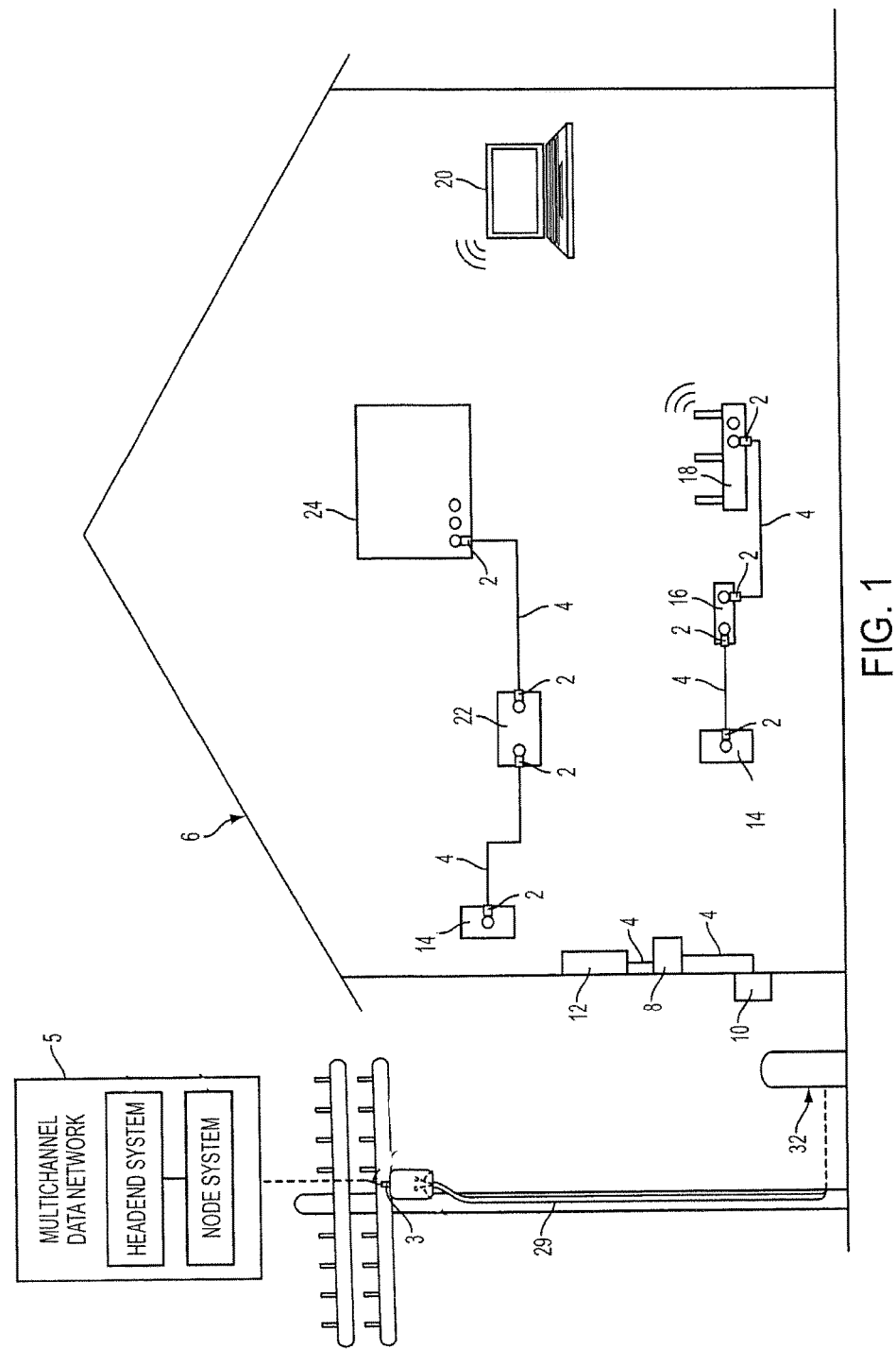
FIG. 1 is a schematic view of an exemplary network environment in accordance with various aspects of the disclosure.

Referring to FIG. 1, cable connectors 2 and 3 enable the exchange of data signals between a broadband network or multichannel data network 5, and various devices within a home, building, venue or other environment 6. For example, the environment's devices can include: (a) a point of entry ("PoE") filter 8 operatively coupled to an outdoor cable junction device 10; (b) one or more signal splitters within a service panel 12 which distributes the data service to interface ports 14 of various rooms or parts of the environment 6; (c) a modem 16 which modulates radio frequency ("RF") signals to generate digital signals to operate a wireless router 18; (d) an Internet accessible device, such as a mobile phone or computer 20, wirelessly coupled to the wireless router 18; and (e) a set-top unit 22 coupled to a television ("TV") 24. In one embodiment, the set-top unit 22, typically supplied by the data provider (e.g., the cable TV company), includes a TV tuner and a digital adapter for High Definition TV.

In some embodiments, the multichannel data network 5 includes a telecommunications, cable/satellite TV ("CATV") network operable to process and distribute different RF signals or channels of signals for a variety of services, including, but not limited to, TV, Internet and voice communication by phone. For TV service, each unique radio frequency or channel is associated with a different TV channel. The set-top unit 22 converts the radio frequencies to a digital format for delivery to the TV. Through the data network 5, the service provider can distribute a variety of types of data, including, but not limited to, TV programs including on-demand videos, Internet service including wireless or WiFi Internet service, voice data distributed through digital phone service or Voice Over Internet Protocol (VoIP) phone service, Internet Protocol TV ("IPTV") data streams, multimedia content, audio data, music, radio and other types of data.

In some embodiments, the multichannel data network 5 is operatively coupled to a multimedia home entertainment network serving the environment 6. In one example, such multimedia home entertainment network is the Multimedia over Coax Alliance ("MoCA") network. The MoCA network increases the freedom of access to the data network 5 at various rooms and locations within the environment 6. The MoCA network, in one embodiment, operates on cables 4 within the environment 6 at frequencies in the range 1125 MHz to 1675 MHz. MoCA compatible devices can form a private network inside the environment 6.

As described above, the data service provider uses coaxial cables 29 and 4 to distribute the data to the environment 6. The environment 6 has an array of coaxial cables 4 at different locations. The connectors 2 are attachable to the coaxial cables 4. The cables 4, through use of the connectors 2, are connectable to various communication interfaces within the environment 6, such as the female interface ports 14 illustrated in FIGS. 1-2. In the examples shown, female interface ports 14 are incorporated into: (a) a signal splitter within an outdoor cable service or distribution box 32 which distributes data service to multiple homes or environments 6 close to each other; (b) a signal splitter within the outdoor cable junction box or cable junction device 10 which distributes the data service into the environment 6; (c) the set-top unit 22; (d) the TV 24; (e) wall-mounted jacks, such as a wall plate; and (f) the router 18.

Figure 2:
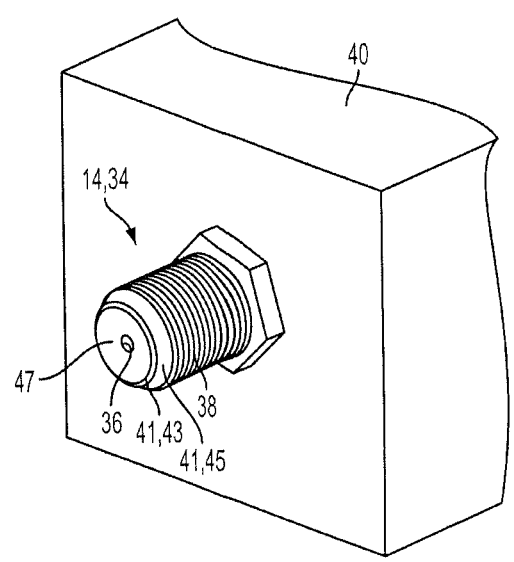
FIG. 2 is a perspective view of an exemplary interface port in accordance with various aspects of the disclosure.

In one embodiment, each of the female interface ports 14 includes a stud or jack, such as the cylindrical stud 34 illustrated in FIG. 2. The stud 34 has: (a) an inner, cylindrical wall 36 defining a central hole configured to receive an electrical contact, wire, pin, conductor (not shown) positioned within the central hole; (b) a conductive, threaded outer surface 38; (c) a conical conductive region 41 having conductive contact sections 43 and 45; and (d) a dielectric or insulation material 47.

In some embodiments, stud 34 is shaped and sized to be compatible with the F-type coaxial connection standard. It should be understood that, depending upon the embodiment, stud 34 could have a smooth outer surface. The stud 34 can be operatively coupled to, or incorporated into, a device 40 which can include, for example, a cable splitter of a distribution box 32, outdoor cable junction box 10 or service panel 12; a set-top unit 22; a TV 24; a wall plate; a modem 16; a router 18; or the junction device 33.

During installation, the installer couples a cable 4 to an interface port 14 by screwing or pushing the connector 2 onto the female interface port 34. Once installed, the connector 2 receives the female interface port 34. The connector 2 establishes an electrical connection between the cable 4 and the electrical contact of the female interface port 34.

Figure 4:
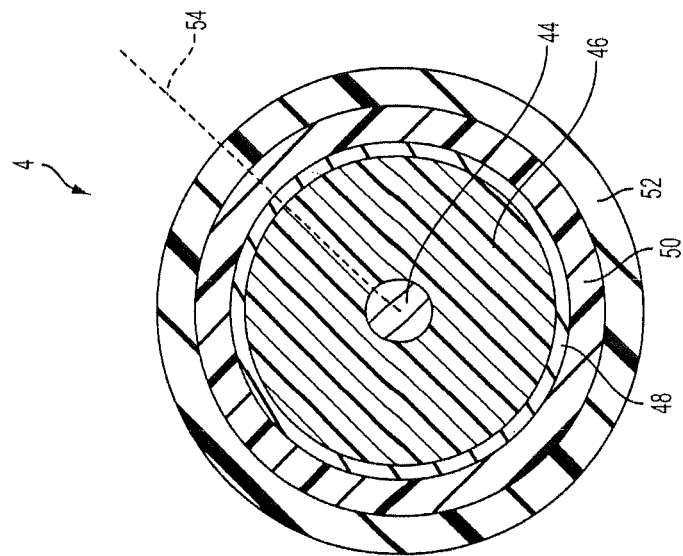
FIG. 4 is a cross-sectional view of the exemplary coaxial cable of FIG. 3.
Figure 3:
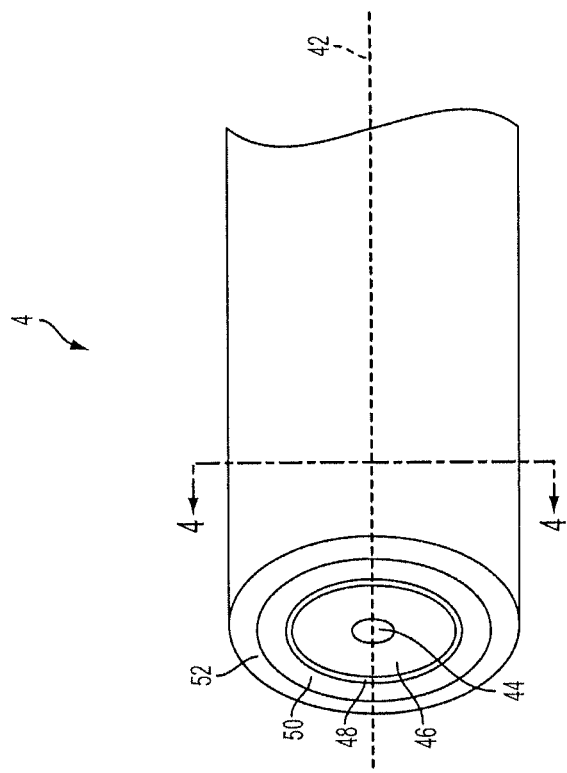
FIG. 3 is a perspective view of an exemplary coaxial cable in accordance with various aspects of the disclosure.
Figure 5:
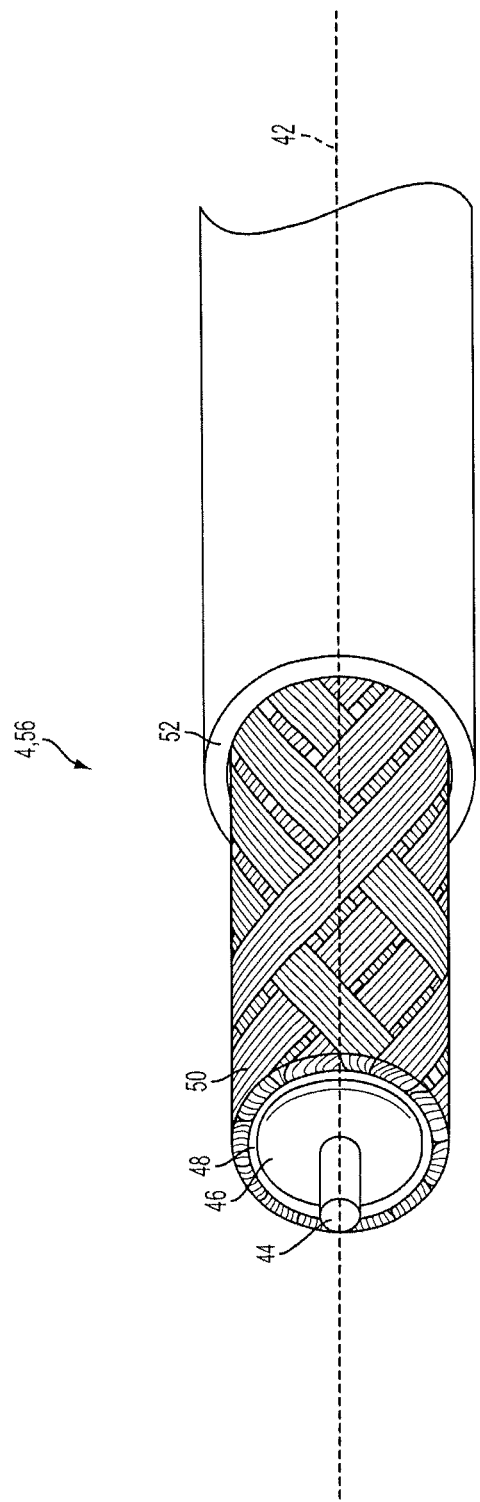
FIG. 5 is a perspective view of an exemplary prepared end of the exemplary coaxial cable of FIG. 3.

Referring to FIGS. 3-5, the coaxial cable 4 extends along a cable axis or a longitudinal axis 42. In one embodiment, the cable 4 includes: (a) an elongated center conductor or inner conductor 44; (b) an elongated insulator 46 coaxially surrounding the inner conductor 44; (c) an elongated, conductive foil layer 48 coaxially surrounding the insulator 46; (d) an elongated outer conductor 50 coaxially surrounding the foil layer 48; and (e) an elongated sheath, sleeve or jacket 52 coaxially surrounding the outer conductor 50.

The inner conductor 44 is operable to carry data signals to and from the data network 5. Depending upon the embodiment, the inner conductor 44 can be a strand, a solid wire or a hollow, tubular wire. The inner conductor 44 is, in one embodiment, constructed of a conductive material suitable for data transmission, such as a metal or alloy including copper, including, but not limited, to copper-clad aluminum ("CCA"), copper-clad steel ("CCS") or silver-coated copper-clad steel ("SCCCS").

The insulator 46, in some embodiments, is a dielectric having a tubular shape. In one embodiment, the insulator 46 is radially compressible along a radius or radial line 54, and the insulator 46 is axially flexible along the longitudinal axis 42. Depending upon the embodiment, the insulator 46 can be a suitable polymer, such as polyethylene ("PE") or a fluoropolymer, in solid or foam form.

In the embodiment illustrated in FIG. 3, the outer conductor 50 includes a conductive RF shield or electromagnetic radiation shield. In such embodiment, the outer conductor 50 includes a conductive screen, mesh or braid or otherwise has a perforated configuration defining a matrix, grid or array of openings. In one such embodiment, the braided outer conductor 50 has an aluminum material or a suitable combination of aluminum and polyester. Depending upon the embodiment, cable 4 can include multiple, overlapping layers of braided outer conductors 50, such as a dual-shield configuration, tri-shield configuration or quad-shield configuration.

In one embodiment, the connector 2 electrically grounds the outer conductor 50 of the coaxial cable 4. The conductive foil layer 48, in one embodiment, is an additional, tubular conductor which provides additional shielding of the magnetic fields. In one embodiment, the jacket 52 has a protective characteristic, guarding the cable's internal components from damage. The jacket 52 also has an electrical insulation characteristic. Referring to FIG. 5, in one embodiment an installer or preparer prepares a terminal end 56 of the cable 4 so that it can be mechanically connected to the connector 2. To do so, the preparer removes or strips away differently sized portions of the jacket 52, outer conductor 50, foil 48 and insulator 46 so as to expose the side walls of the jacket 52, outer conductor 50, foil layer 48 and insulator 46 in a stepped or staggered fashion. In the example shown in FIG. 5, the prepared end 56 has a two step-shaped configuration. In some embodiments, the prepared end has a three step-shaped configuration (not shown), where the insulator 46 extends beyond an end of the foil 48 and outer conductor 50. At this point, the cable 4 is ready to be connected to the connector 2.

Referring now to FIGS. 6-13, the preparer uses a cable stripping tool 100 to remove such portions of the cable 4 to provide the prepared end 56. According to various aspects of the disclosure, the cable stripping tool 100 includes a receptacle 102 configured to receive a modular blade cartridge 101. The receptacle 102 may be disposed at a first end 104 of the tool 100. The stripping tool 100 includes a handle portion 260 at a second end 106 opposite to the first end 104.

Referring to FIGS. 8-13, the blade cartridge 101 includes a mounting body 110 having a forward stop surface 112 and a pair of opposite side surfaces 116, 117 arranged perpendicular to the forward stop surface 112. Guide rails 140, 142 extend along the respective side surfaces 116, 117 of the mounting body 110 and are configured to be received by corresponding guide rails (144, FIGS. 12 and 13) of the receptacle 102.

The receptacle 102 includes a first stop surface 114 and a second stop surface 134 facing one another. As discussed above, the receptacle 102 also includes opposing side walls 124 having guide rails 144, shown in FIG. 13, configured to receive the guide rails 140, 142 extending along the respective side surfaces 116, 117 of the mounting body 110. The mounting body 110 may be assembled with the receptacle 102 by aligning the guide rails 140, 142 of the mounting body 110 with the guide rails 144 of the receptacle 102 and sliding the mounting body 110 relative to the receptacle 102, guided by the guide rails 140, 142, 144, in a direction toward and/or away from the first stop surface 114 and the second stop surface 134.

Figure 11:
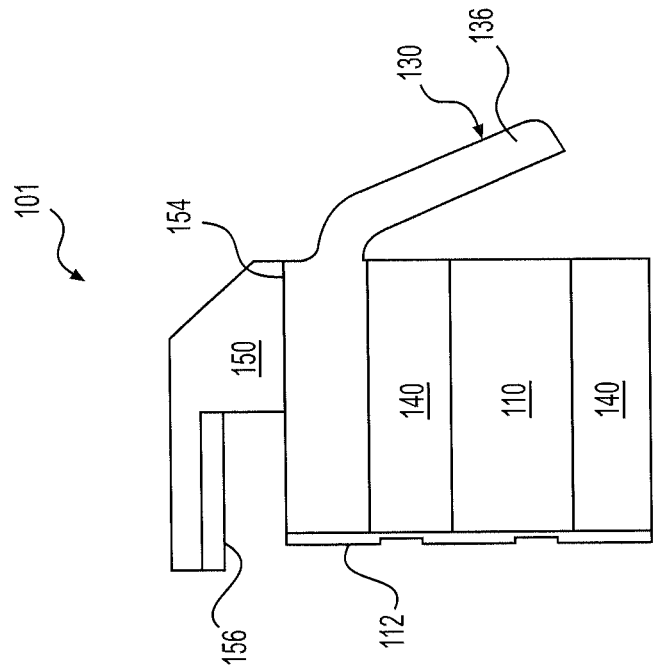
FIG. 11 is a side view of the exemplary blade cartridge of FIG. 8.
Figure 10:
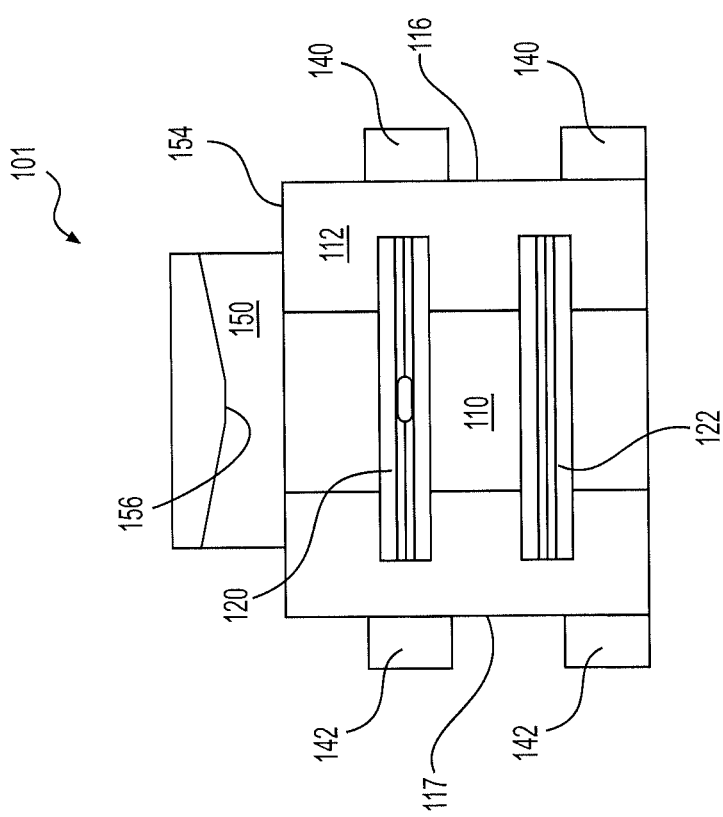
FIG. 10 is a front view of the exemplary blade cartridge of FIG. 8.

The cable stripping tool further includes a biasing member 130 disposed between a rearward surface 111 of the mounting body 110, opposite to the forward stop surface 112, and the second stop surface 134 of the receptacle. In some aspects, as shown in FIGS. 8, 9, and 11, the biasing member 130 may be integrally constructed with the mounting body 110, for example, by molding. In such an embodiment, the biasing member 130 extends from the rearward surface 111 of the mounting body 110 toward the second stop surface 134 of the receptacle. In other aspects, the biasing member 130 may be integrally constructed with the second stop surface 134 of the receptacle 102, for example, by molding. In still other aspects, the biasing member 130 may be constructed separate from the receptacle 102 and the mounting body 110 and be disposed therebetween.

Figure 12:
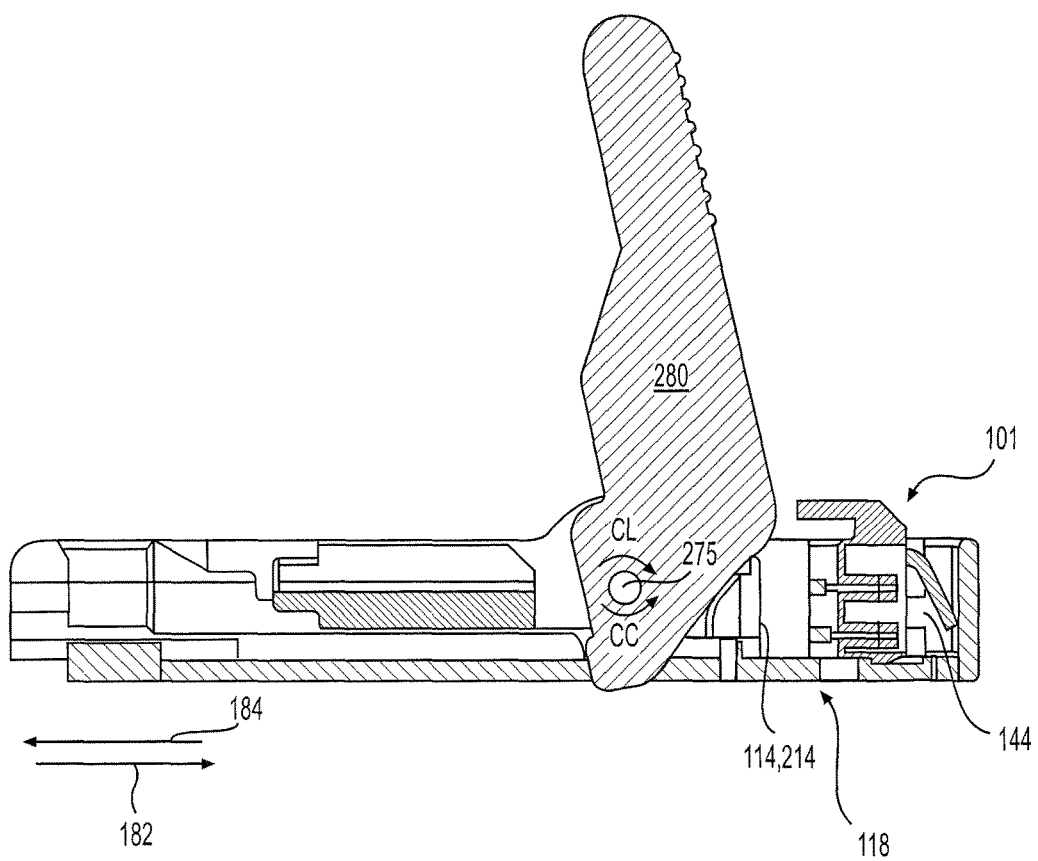
FIG. 12 is a side cross-sectional view of the exemplary stripping tool of FIG. 6 in a configuration ready to receive an end of a coaxial cable.

In the embodiment shown in FIGS. 8, 9, and 11-13, the biasing member 130 is integrally molded with, and projects from, the rearward surface 111 of the mounting body 110. For example, the biasing member 130 may include one or more of cantilever springs 136 integrally molded with the mounting fixture 110. As best illustrated in FIG. 12, one embodiment of the biasing member 130 includes a pair of spaced apart cantilever springs 136. The cantilever springs 136 are configured to engage the second stop surface 134 of the receptacle 102 to bias/urge the stripping blades 120, 122 toward the first stop surface 114 of the receptacle 102, i.e., in the direction of arrow FD.

Referring again to FIGS. 6-11, the mounting body 110 includes a stop member 150 extending from a top or upper surface 154 of the mounting body 110. The stop member 150 defines an upper stop surface 156 which faces downwardly toward a pair of stripping blades 120, 122. The upper stop surface 156 is spaced a predetermined distance from the pair of stripping blades 120, 122, as described in more detail below.

Referring to FIG. 9, the receptacle 102 includes an opening 118 that cooperates with the mounting body 110 to define a passage configured to receive the end of a coaxial cable 4. The size of the passage 119 may be varied by moving the mounting body 110 relative to the receptacle 102. For example, before a coaxial cable is inserted into the opening 118, the mounting body 110 is urged toward the first stop surface 114 by the biasing member 130, such that the forward stop surface 112 of the mounting body 110 abuts the first stop surface 114, and the size of the passage 119 will be too small to receive the end of the coaxial cable 4. However, when the mounting body 110 is forced to move in the direction of the second stop surface 134 of the receptacle 102 such that the biasing member 130 is compressed between the rearward surface 111 of the mounting body 110 and the second stop surface 134, the passage 119 can be made large enough to receive the end of the coaxial cable 4.

Figure 13:
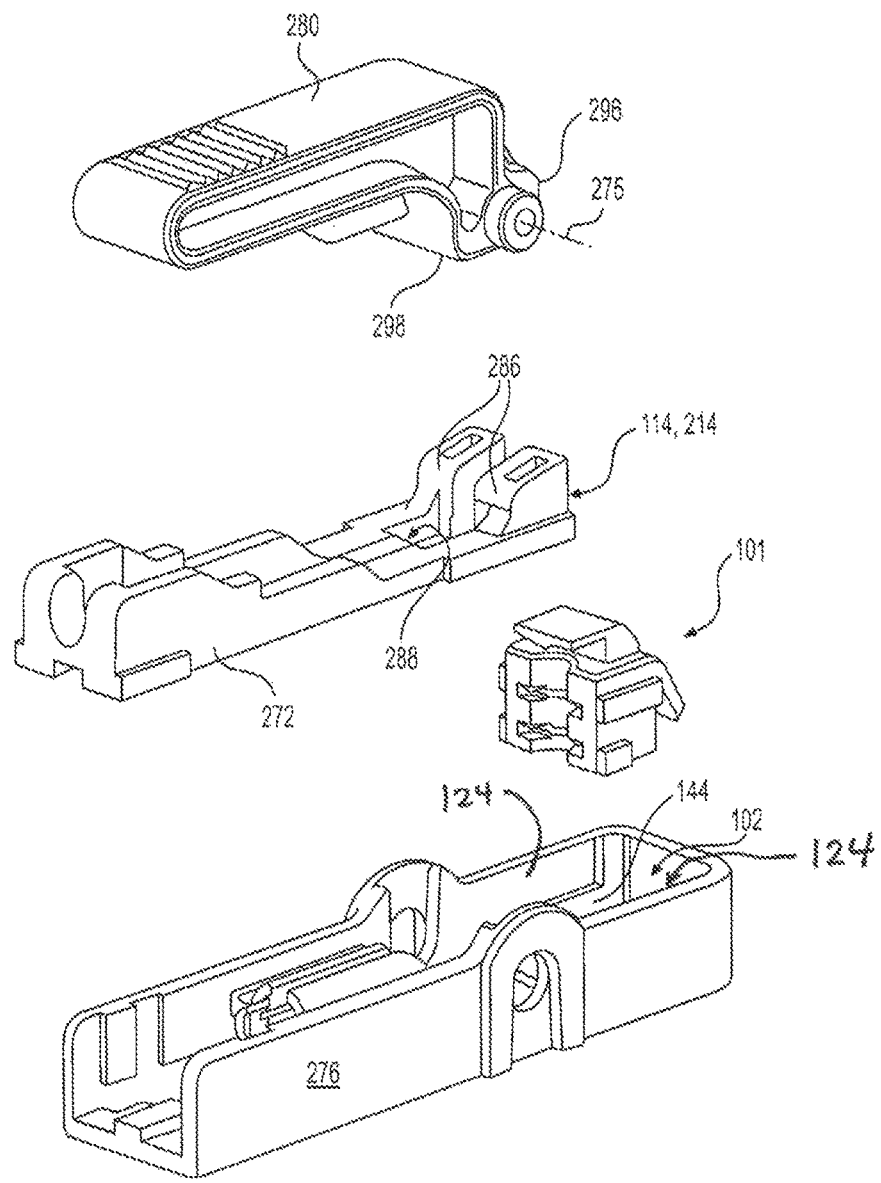
FIG. 13 is an exploded view of the exemplary stripping tool of FIG. 6.

Referring to FIG. 13, in some embodiments, the first stop surface 114 of the receptacle 102 may be defined by a surface 214 of a movable slide 272 in the handle portion 260 of the tool 100. The handle portion 260 may include a lever arm 280 pivotably mounted to a frame 276. The lever arm 280 may be operative to displace the moveable slide 272, and thus the first stop surface 114, 214 in a direction away from the second stop surface 134 of the receptacle 102. For example, the moveable slide 272 may include first cam follower surfaces 286 and second cam follower surfaces 288. The lever arm 280 rotates about a pivot axis 275 and includes first and second cam surfaces 296, 298 disposed on each side of the pivot axis 275. The first and second cam surfaces 296, 298 of the lever arm 280 may essentially extend from one side of the lever arm 280 to the opposite side. Rotation of the lever arm 280 in a counterclockwise direction CC causes the first cam surface 296 to engage the first cam follower surfaces 286 and displace the moveable slide 272 rearwardly in the direction of arrow 182. Rotation of the lever arm 280 in a clockwise direction CL effects forward displacement of the moveable slide 270, i.e., in the direction of arrow 184, as the second cam surface 298 engages the second cam follower surfaces 288.

The blade cartridge 101 includes the pair of stripping blades 120, 122. The stripping blades 120, 122 are fixedly coupled with the blade cartridge 101 and have blade edges 121, 123 exposed adjacent the forward stop surface 112 of the mounting body 110. According to various aspects, the blades 120, 122 are affixed or bonded to a forward end 126 of the mounting fixture 110 such that the blade edges 121, 123 are orthogonal to an elongate axis 4A of the coaxial cable 4. Further, the blades 120, 122 are molded in with the mounting body 110 and the stop member 150 to establish and maintain an accurate vertical spacing or dimension between the blades 120, 122 and the upper stop surface 156.

As best illustrated in FIGS. 8 and 9, the blade edges 121, 123 are disposed at different distances relative to the forward stop surface 112 of the mounting body 110 and thus are disposed at different distances relative to the elongate axis 4A of the coaxial cable 4 when the forward stop surface 112 of the cartridge abuts the first stop surface 114 of the receptacle 102. For example, the first blade edge 121 is disposed closer to the forward stop surface 112 than the second blade edge 123. The first stripping blade 120 also includes a notch 125 at a central region of the first blade edge 121. Thus, when the forward stop surface 112 of the cartridge abuts the first stop surface 114 of the receptacle 102, the first blade edge 121 is spaced a predetermined distance from the elongate axis 4A of the coaxial cable 4 and the notch 125 is sized such that the first blade 120 cuts through the jacket 52, the outer conductor 50, the foil 48, and the insulator 46 to the inner conductor 44. Meanwhile, when the forward stop surface 120 of the cartridge abuts the first stop surface 114 of the receptacle 102, the second stripping blade 123 is spaced a predetermined distance from the elongate axis 4A of the coaxial cable 4 such that the second blade 122 cuts only through the jacket 52.

It will be appreciated that aforementioned arrangement facilitates geometric accuracy during manufacturing, thereby ensuring that the blades 120, 122 are accurately spaced to form the first and second steps in the prepared end 56 of the coaxial cable 4. Similar to the relative spacing and alignment between the stripping blades 120, 122, the stop surface 156 is accurately molded to define the spacing between an end of the inner conductor 44 and the first step of the coaxial cable 4, i.e., determined by the first stripping blade 120.

In use, an operator either (1A) pulls back the modular cartridge 101 against the force of the biasing member 130 in the direction of arrow RD to receive the end of a cable 4 through the aperture 118 in the base 136 of the receptacle 102 and into the passage 119, or (1B) rotates the lever arm 280 initially in a clockwise direction CL to a substantially vertical position (FIG. 12) to enlarge the passage 119 to receive the cable 4. The end of the cable 4 contacts the upper stop surface 156 of the stop member 150 to ready the cable 4 for stripping. Then, depending on whether the operator used (1A) or (1B) above, the operator either (2A) releases the modular cartridge 101, causing the blades 120, 122 to engage the outer jacket 52 of the coaxial cable 4, or (2B) rotates the lever arm 280 in a counter-clockwise direction CC to cause the first stop surface 114 of the receptacle 102 slide back toward the second stop surface 134 and engage the outer jacket 52 of the cable 4.

The stripping tool 100 is then rotated several turns around the cable 4 until the forward stop surface 112 of the cartridge 102 engages the first stop surface 114 of the receptacle 102. The geometry of the stop surfaces 112, 114 causes the blade edges 121, 123 of the razor blades 120, 122 to sever the cable 4 to a precise depth. More specifically, the first blade 120 cuts through the outer jacket 52, the outer conductor 50, the inner foil layer 48, and the dielectric core 46 to a depth corresponding to the inner conductor 44 of the cable 4. The second blade 122 cuts through the outer jacket 52 to a depth corresponding to the outer conductor 50 of the cable 4. At these depths, the cable sheathing can be slid-off and removed from the coaxial cable 4 to expose the peripheral surface of the inner conductor 44 and peripheral surface of the outer conductor 50. This action is assisted or augmented with the aid of the handle portion 260 of the tool 100.

The spring-biased mounting body 110 of the stripping tool 100 amounts to a modular cartridge 101 which can be removed from and installed into a receptacle 102 of the tool 100. The biasing member 130, i.e., the cantilevered springs 136, serve to both secure the module blade cartridge 101 within the tool 100 while furthermore providing a predetermined/predefined spring force requisite to sever the cable sheathing, i.e., the outer jacket 52, outer conductor 50, and/or inner core 46 of the coaxial cable 4. Moreover, inasmuch as the modular blade cartridge 101 may be integrated with a tool which also provides cable compression, the cost of a separate stripping tool may be eliminated. While the cost of the stripping tool 100 may be increased by the cost of the modular cartridge 101, the elimination of a dedicated/separate stripping tool compensates for the increased cost of the cartridge 101. Consequently, the cost of the tool required for the preparing and securing a connector to an end of a coaxial cable may be reduced.

It should be appreciated that the modular blade cartridge 101 may be incorporated in any stripping tool having a suitable structure for receiving a cable, rotating relative to the cable, and/or removing sheathing from the cable. The cable sheathing material is the material that surrounds, protects, insulates, or holds the internal wires, such as, for example, the inner and/or outer conductors of the coaxial cable 4. In some embodiments, the modular blade cartridge 101 may be synergistically combined with a compression tool to produce a hybrid stripping/compression tool (hereinafter the "hybrid tool"). For example, the handle portion 260 of the stripping tool 100 may include a compression tool 270. Thus, a preparer can use the first end 104 of the stripping tool 100 to remove sheathing material from the cable 4 to prepare the end of the cable 4 to receive a connector (not shown) and then use the second end 106 of the stripping tool 100 to compress elements of the connector (not shown) against the sheathing material and/or between the sheathing material and the connector to secure the cable to the connector.

In one embodiment, as shown in FIG. 1, the handle portion 260 of the stripping tool 100 may include a movable slide 272 having a recess 274 for accepting a connector (not shown) assembled in combination with a prepared end of a coaxial cable (not shown). The tool 270 may also include a fixed guide or frame 276 having a static plunger 278 (see FIG. 7) disposed in opposed relation to the connector when received within the recess 274 of the moveable slide 272, and the lever arm 280 pivotally mounted to the fixed guide or frame 276 and operative to displace the moveable slide 272 toward the static plunger 278 such that the connector (not shown) is axially compressed by the static plunger 278. Compression of the connector by the static plunger 278 secures the connector to the coaxial cable 4.

Additional embodiments include any one of the embodiments described herein, where one or more of its components, functionalities, or structures is interchanged with, replaced by or augmented by one or more of the components, functionalities, or structures of a different embodiment described herein.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed herein, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of this disclosure. Moreover, although specific terms are employed herein, they are used only in a generic and descriptive sense, and not for the purposes of limiting the present disclosure.

What is claimed is:

1. A cable stripping tool for preparing a coaxial cable for insertion into a coaxial cable connector, the cable stripping tool comprising:
    a receptacle defining an opening for receiving an end of the coaxial cable, the opening defining an axis along which an elongated axis of the coaxial cable extends into the receptacle;
    a cartridge disposed in the receptacle, the cartridge being configured for sliding movement relative to the receptacle in a back-and-forth direction substantially orthogonal to the axis of the opening, the cartridge holding at least one cutting blade, the at least one cutting blade having a blade edge extending substantially orthogonal to the axis of the opening; and
    a biasing member coupled with the cartridge and configured to bias the cartridge toward a first stop surface of the receptacle, the first stop surface being at an opposite side of the opening relative to the biasing member.

2. The cable stripping tool of claim 1, wherein the blade edge is disposed at a first surface of the cartridge, and wherein the biasing member is between a second surface of the cartridge and a second stop surface of the receptacle, the second surface of the cartridge being at an opposite side of the cartridge relative to the first surface of the cartridge, and the second stop surface of the receptacle facing the second surface of the cartridge.

3. The cable stripping tool of claim 2, wherein the biasing member is integrally formed with and extends from the second surface of the cartridge.

4. The cable stripping tool of claim 1, wherein the receptacle includes a first guide member and the cartridge includes a second guide member, the first guide member and the second guide member cooperate with one another to guide the sliding movement of the cartridge relative to the receptacle in the back-and-forth direction.

5. The cable stripping tool of claim 1, wherein the cartridge comprises a mounting body and a stop member,
    wherein the at least one blade is affixed to the mounting body and includes (i) a first blade extending in the back-and-forth direction and having a first blade edge adjacent a first surface of the cartridge, and (ii) a second blade extending in the back-and-forth direction and having a second blade edge adjacent the first surface of the cartridge, the first blade edge and the second blade edge being spaced apart by a first predetermined distance along the axis of the opening and providing different cutting depths in a direction orthogonal to the elongated axis of the coaxial cable, and
    wherein the stop member includes a stop surface spaced a second predetermined distance from the first blade edge and the second blade edge.

6. The cable stripping tool of claim 5, further comprising at least one guide member on each of two side surfaces of the mounting body, the two side surfaces being orthogonal to the first surface of the cartridge, the guide members extending in the back-and-forth direction.

7. The cable stripping tool of claim 1, wherein the receptacle includes a second stop surface at an opposite end of the receptacle relative to the first stop surface, the first stop surface of the receptacle being slidable relative to the second stop surface of the receptacle.

8. The cable stripping tool of claim 1, wherein the cartridge is slidable relative to the receptacle to enlarge a passage for receiving the end of the coaxial cable.

9. The cable stripping tool of claim 1, wherein, when the end of the coaxial cable is inserted into the opening, rotation of the tool relative to the end of the coaxial cable and urging of the cartridge toward the first stop surface by the biasing member causes the at least one blade to cut through the coaxial cable to a desired depth.

10. The cable stripping tool of claim 1, wherein the receptacle is at a first end of the tool, and a second end of the tool, opposite to the first end, comprises a handle portion.

11. The cable stripping tool of claim 10, wherein the handle portion includes a compression tool configured to attach a coaxial cable connector to a prepared end of the coaxial cable.

12. A cable stripping tool comprising:
a receptacle defining an opening for receiving an end of the coaxial cable, the opening defining an axis along which an elongated axis of the coaxial cable extends into the receptacle; and
a cartridge disposed in the receptacle, the cartridge being configured for sliding movement relative to the receptacle in a back-and-forth direction substantially orthogonal to the axis of the opening, the cartridge holding at least one cutting blade, the at least one cutting blade having a blade edge extending substantially orthogonal to the axis of the opening,
wherein the cartridge includes a biasing portion configured to bias the cartridge toward a first stop surface of the receptacle, the first stop surface being at an opposite side of the opening relative to the biasing portion.

13. The cable stripping tool of claim 12, wherein the blade edge is disposed at a first surface of the cartridge, and wherein the biasing member is between a second surface of the cartridge and a second stop surface of the receptacle, the second surface of the cartridge being at an opposite side of the cartridge relative to the first surface of the cartridge, and the second stop surface of the receptacle facing the second surface of the cartridge.

14. The cable stripping tool of claim 12, wherein the receptacle includes a first guide member and the cartridge includes a second guide member, the first guide member and the second guide member cooperate with one another to guide the sliding movement of the cartridge relative to the receptacle in the back-and-forth direction.

15. The cable stripping tool of claim 12, wherein the cartridge comprises a mounting body and a stop member,
wherein the at least one blade is affixed to the mounting body and includes (i) a first blade extending in the back-and-forth direction and having a first blade edge adjacent a first surface of the cartridge, and (ii) a second blade extending in the back-and-forth direction and having a second blade edge adjacent the first surface of the cartridge, the first blade edge and the second blade edge being spaced apart by a first predetermined distance along the axis of the opening and providing different cutting depths in a direction orthogonal to the elongated axis of the coaxial cable, and
wherein the stop member includes a stop surface spaced a second predetermined distance from the first blade edge and the second blade edge.

16. The cable stripping tool of claim 15, further comprising at least one guide member on each of two side surfaces of the mounting body, the two side surfaces being orthogonal to the first surface of the cartridge, the guide members extending in the back-and-forth direction.

17. The cable stripping tool of claim 12, wherein the receptacle includes a second stop surface at an opposite end of the receptacle relative to the first stop surface, the first stop surface of the receptacle being slidable relative to the second stop surface of the receptacle.

18. The cable stripping tool of claim 12, wherein the cartridge is slidable relative to the receptacle to enlarge a passage for receiving the end of the coaxial cable.

19. The cable stripping tool of claim 12, wherein, when the end of the coaxial cable is inserted into the opening, rotation of the tool relative to the end of the coaxial cable and urging of the cartridge toward the first stop surface by the biasing member causes the at least one blade to cut through the coaxial cable to a desired depth.

20. The cable stripping tool of claim 12, wherein the receptacle is at a first end of the tool, and a second end of the tool, opposite to the first end, comprises a handle portion.

21. The cable stripping tool of claim 20, wherein the handle portion includes a compression tool configured to attach a coaxial cable connector to a prepared end of the coaxial cable.

22. A cable stripping tool comprising:
a receptacle defining an opening for receiving an end of the coaxial cable, the opening defining an axis along which an elongated axis of the coaxial cable extends into the receptacle, the receptacle having a first stop surface and a second stop surface at opposite sides of the opening; and
a cartridge disposed in the receptacle, the cartridge being configured for sliding movement relative to the receptacle in a back-and-forth direction substantially orthogonal to the axis of the opening, the cartridge holding at least one cutting blade, the at least one cutting blade having a blade edge extending substantially orthogonal to the axis of the opening,
wherein the receptacle includes a biasing portion configured to bias the cartridge toward the first stop surface of the receptacle, the first stop surface being at an opposite side of the opening relative to the biasing portion.

* * * * *